(12) United States Patent
Fischer

(10) Patent No.: US 12,510,202 B2
(45) Date of Patent: Dec. 30, 2025

(54) VISCOSITY-SENSITIVE THROTTLE, AND LIQUID PIPE COMPRISING A THROTTLE

(71) Applicant: Bayerische Motoren Werke Aktiengesellschaft, Munich (DE)

(72) Inventor: Christian Fischer, Weistrach (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 430 days.

(21) Appl. No.: 18/020,974

(22) PCT Filed: Jul. 22, 2021

(86) PCT No.: PCT/EP2021/070463
§ 371 (c)(1),
(2) Date: Feb. 13, 2023

(87) PCT Pub. No.: WO2022/037893
PCT Pub. Date: Feb. 24, 2022

(65) Prior Publication Data
US 2023/0288008 A1    Sep. 14, 2023

(30) Foreign Application Priority Data
Aug. 18, 2020  (DE) ............. 10 2020 121 606.8

(51) Int. Cl.
*F16L 55/027*  (2006.01)
*F15D 1/02*  (2006.01)

(52) U.S. Cl.
CPC ........ *F16L 55/02736* (2013.01); *F15D 1/025* (2013.01)

(58) Field of Classification Search
CPC ............................ F16L 55/02736; F15D 1/025

USPC .......................................................... 138/42
See application file for complete search history.

(56) References Cited

U.S. PATENT DOCUMENTS

| | | | | |
|---|---|---|---|---|
| 2,008,722 A | * | 7/1935 | McClintock | F16L 55/02736 138/43 |
| 2,400,161 A | * | 5/1946 | Allerton | F16L 55/02736 138/42 |
| 3,152,617 A | * | 10/1964 | Justus | F16K 25/04 137/625.5 |
| 3,470,912 A | | 10/1969 | Bydal | |
| 4,043,360 A | * | 8/1977 | Yaron | F16L 55/02736 138/42 |
| 9,651,186 B2 | | 5/2017 | Ahuja et al. | |

(Continued)

FOREIGN PATENT DOCUMENTS

| DE | 1 978 890 U | 2/1968 |
|---|---|---|
| DE | 33 44 011 A1 | 3/1985 |

(Continued)

OTHER PUBLICATIONS

International Search Report (PCT/ISA/210) issued in PCT Application No. PCT/EP2021/070463 dated Oct. 28, 2021 with English translation (seven (7) pages).

(Continued)

*Primary Examiner* — David R Deal
(74) *Attorney, Agent, or Firm* — Crowell & Moring LLP

(57) ABSTRACT

A throttle for a liquid pipe has at least one liquid duct for a liquid flowing through the throttle, the liquid duct extending along the longitudinal axis of the throttle. The liquid duct has at least one duct wall having a curved shape along the longitudinal axis.

19 Claims, 3 Drawing Sheets

(56) References Cited

U.S. PATENT DOCUMENTS

| | | | |
|---|---|---|---|
| 2011/0061613 A1* | 3/2011 | Hutchins | F01P 3/2271 |
| | | | 123/41.01 |
| 2016/0215914 A1* | 7/2016 | Lewis | B22F 10/28 |
| 2020/0023433 A1* | 1/2020 | Lewis | B22F 5/106 |
| 2020/0248838 A1 | 8/2020 | Anandbabu et al. | |

FOREIGN PATENT DOCUMENTS

| | | |
|---|---|---|
| DE | 42 39 643 A1 | 4/1993 |
| DE | 44 02 515 A1 | 9/1994 |
| DE | 10 2017 213 002 A1 | 1/2019 |

OTHER PUBLICATIONS

German-language Written Opinion (PCT/ISA/237) issued in PCT Application No. PCT/EP2021/070463 dated Oct. 28, 2021 (six (6) pages).
German-language Search Report issued in German Application No. 10 2020 121 606.8 dated Mar. 30, 2021 with partial English translation (11 pages).

\* cited by examiner

VISCOSITY-SENSITIVE THROTTLE, AND LIQUID PIPE COMPRISING A THROTTLE

BACKGROUND AND SUMMARY OF THE INVENTION

The invention relates to a throttle for a liquid pipe, in particular for a liquid pipe in a liquid circuit.

A vehicle can have one or more liquid circuits, for example in order to supply a component of the vehicle, for example a transmission, with a certain liquid, in particular with oil. In this case, the liquid circuit can have the component supplied with the liquid or through which the liquid flows, and a cooling unit for cooling the liquid.

The temperature of the liquid in a liquid circuit can differ, depending on the operating state of the component through which flow takes place and/or at different ambient temperatures. As a result, the viscosity of the liquid within the liquid circuit can also change.

The component of the liquid circuit through which the liquid flows can have certain flow requirements in respect of the volume flow of the liquid through the component and/or in respect of the pressure gradient or the pressure loss of the liquid as it flows through the component. The one or more flow requirements can be different for different temperatures and/or different viscosity values of the liquid.

The present document deals with the technical object of efficiently and accurately meeting the requirements of a component through which a liquid flows in respect of the pressure loss of the liquid within the component for different viscosity values of the liquid.

The object is achieved by the claimed invention. Attention is drawn to the fact that additional features of a patent claim dependent on an independent patent claim, without the features of the independent patent claim or only in combination with a subset of the features of the independent patent claim, can form a separate invention which is independent of the combination of all the features of the independent patent claim and can be made the subject matter of an independent claim, a divisional application or a subsequent application. This applies in the same way to technical teachings described in the description which can form an invention independent of the features of the independent patent claims.

According to one aspect, a throttle for a liquid pipe is described. The throttle can be designed as a passive and/or as a flow-relevant object which can be introduced into the hollow profile of a liquid pipe. In this case, the cross section of the throttle can be adapted to the hollow profile, and therefore the throttle is held at a specific point within the liquid pipe by way of a press fit and/or by static friction. In particular, the throttle can be designed in such a way that one or more walls (also referred to as ribs) of the throttle touch the inner wall of the liquid pipe (and thus form a frictional connection between the throttle and the liquid pipe) when the throttle is arranged in the liquid pipe. The liquid pipe can be part of a component of a liquid circuit (e.g. part of a transmission of a vehicle). The throttle can be designed to be flowed through by oil as the liquid.

The throttle can have an elongate shape. In particular, the throttle can have a length along the longitudinal axis of the throttle which is greater than the diameter of the cross section of the throttle transversely with respect to the longitudinal axis, in particular by a factor of 2 or more or by a factor of 4 or more. The length of the throttle along the longitudinal axis can be, for example, 50 mm or more, e.g. between 50 mm and 100 mm.

The throttle comprises at least one liquid channel for a liquid (e.g. oil) flowing through the throttle, which channel extends along the longitudinal axis of the throttle. The liquid channel can be designed to be flowed through by liquid (in particular oil) along the longitudinal axis. The liquid channel can, for example, have a cross section (perpendicularly to the longitudinal axis) with a diameter or with an edge length of between 1 mm and 3 mm.

The liquid channel can have at least one channel wall (or channel rib) which extends along the longitudinal axis from a first end (the inlet) to a second end (the outlet) of the throttle. Typically, the liquid channel is delimited by at least two channel walls. Furthermore, the throttle can be designed, in particular adapted to the hollow profile of the liquid pipe, in such a way that the inner wall of the liquid pipe forms a (further) wall of the liquid channel when the throttle is situated in the liquid pipe.

At least one channel wall of the at least one liquid channel has a shape which curves along the longitudinal axis (which causes the direction of flow of the liquid within the liquid channel to change along the longitudinal axis). In particular, at least one channel wall does not have a rectilinear shape which extends continuously parallel to the longitudinal axis from the first end to the second end of the throttle. In this case, the at least one channel wall can have a shape which curves in such a way that the effective length of the channel wall along which liquid slides as it flows through the liquid channel is at least 5% or 10% greater than the length of a channel wall having a rectilinear shape along the longitudinal axis.

A channel wall having a shape which curves along the longitudinal axis can have a shape which undulates about a wall axis arranged parallel to the longitudinal axis. In this case, the channel wall can have, for example, the shape of a sinusoidal signal, of a triangular signal or of a rectangular signal, which undulates about the wall axis. In this case, the channel wall can move alternately toward the middle of the liquid channel and away from the middle of the liquid channel.

A channel wall (or channel rib) having a shape which curves along the longitudinal axis can be designed in such a way that the channel wall has a rectilinear shape along a vertical axis perpendicular to the wall or longitudinal axis.

The throttle described is thus one which has at least one liquid channel, which is delimited by at least one channel wall which has a curved shape along the longitudinal axis of the throttle. By providing one or more liquid channels, each having at least one channel wall extending in a curved manner, requirements in respect of the pressure loss of liquid within a liquid pipe can be set in a manner which is precise and efficient in terms of installation space, in particular for different viscosity values of the kinematic viscosity of the liquid which flows through the liquid pipe.

The length of the throttle, in particular the (effective) length of the at least one channel wall, along the longitudinal axis, and/or the curved shape of the at least one channel wall can be designed in such a way that the liquid flowing through the throttle has a respective specified desired pressure loss for each of at least two different viscosity values as it flows through the throttle. In particular, the at least one liquid channel of the throttle can be designed in such a way that, as a result of the curved shape of the at least one channel wall, a pressure loss of the liquid as it flows through the liquid channel is increased in comparison with a liquid channel which has a rectilinear shape of the channel wall. The increase in the pressure loss can be 1 bar or more, in particular for a liquid which has a kinematic viscosity of $10^{-4}$ m²/s or higher. In this way, the flow requirements of a component of a liquid circuit can be met in a particularly efficient and precise manner.

As already explained above, the at least one liquid channel of the throttle can be delimited by at least two channel walls. In this case, at least one of the at least two channel walls can have a shape which curves along the longitudinal axis. In one example, at least two channel walls each have a shape which curves along the longitudinal axis. In this case, the at least two channel walls have a shape which is complementary to one another in such a way that the clear cross section of the liquid channel varies by at most 20%, in particular by at most 10%, along the longitudinal axis. In other words, the channel walls of a liquid channel can have a shape which curves in such a way that the cross section of the liquid channel through which liquid can flow remains substantially constant along the longitudinal axis of the throttle. Thus, impairments of the volume flow of the liquid through the throttle can be avoided in a reliable manner.

Alternatively or in addition, the throttle can be designed in such a way, in particular by way of a corresponding construction of the one or more liquid channels and/or of the one or more channel walls, that the clear cross section of the throttle (in total or overall) varies by at most 20%, in particular by at most 10%, along the longitudinal axis. In other words, the throttle can be designed in such a way that the cross section of the one or more liquid channels of the throttle through which (overall) liquid can flow remains substantially constant (in total) along the longitudinal axis of the throttle. Thus, impairments of the volume flow of the liquid through the throttle can be avoided in a reliable manner.

Two liquid channels lying directly next to one another can have a common channel wall, which separates the two liquid channels from one another. This channel wall lying between the two liquid channels can have a shape which curves along the longitudinal axis. Two liquid channels can thus share a common channel wall having a shape which curves along the longitudinal axis.

As already explained above, the throttle can have a plurality of liquid channels, of which at least one liquid channel is delimited by at least one channel wall having a shape which curves along the longitudinal axis. By providing a plurality of liquid channels, each of which can have channel walls with different (curved) shapes along the longitudinal axis, flow requirements of a component of a liquid circuit can be met in a particularly efficient and precise manner.

A channel wall having a curved shape can have different rectilinear sections which alternate repeatedly along the longitudinal axis and are each at different distances from the longitudinal axis. The individual rectilinear sections can each extend parallel to the longitudinal axis or to the wall axis. Transitions between the sections, which extend obliquely with respect to the longitudinal axis, can then be arranged between rectilinear sections which are directly adjacent to one another. The individual rectilinear sections can be arranged alternately on one side and on the opposite, other side of the wall axis.

Alternatively or in addition, a channel wall having a curved shape can have a sinusoidal or serpentine shape along the longitudinal axis (about the wall axis).

In particular, a channel wall having a curved shape can be designed to change the direction of flow of the liquid in the liquid channel repeatedly, in particular periodically, along the longitudinal axis (in particular in such a way that the direction of flow is not arranged parallel to the longitudinal axis of the throttle, at least in some region or regions). In particular, a direction of liquid flow which fluctuates to and fro about the longitudinal axis can be brought about by the channel wall.

By way of a channel wall designed in this way, the friction of the liquid on the channel wall can be increased in an efficient and reliable manner in order to meet the flow requirements of a component of a liquid circuit.

The throttle can have a (planar) dividing wall which extends along the longitudinal axis and divides the throttle into a first subregion and a second subregion. The individual channel walls can optionally be arranged perpendicularly to the dividing wall. In particular, the individual channel walls can be perpendicularly secured on the dividing wall or connected to the dividing wall.

The throttle can in each case have at least one liquid channel in the first subregion and in the second subregion. In this case, the dividing wall can in each case form a wall of the liquid channel in the first subregion and a wall of the liquid channel in the second subregion. The dividing wall can be designed to touch the inner wall of the liquid pipe in which the throttle is to be arranged.

A liquid channel can thus be delimited (optionally completely) by two channel walls, by the dividing wall and by the inner wall of the liquid pipe.

The throttle can be of symmetrical construction. In this case, it is possible, in particular, for the dividing wall to form a or the plane of symmetry of the throttle. The first subregion and the second subregion of the throttle can thus be of identical and/or corresponding construction to one another.

Providing a (planar) dividing wall on which the individual liquid channels of the throttle are arranged enables the throttle to be produced in a particularly efficient manner. In this case, the throttle can preferably be constructed in such a way that the throttle can be manufactured (completely) in an open-and-shut injection mold.

According to a further aspect, a description is given of a liquid pipe having a hollow profile in which at least one throttle designed as described in this document is arranged.

According to a further aspect, a description is given of a liquid circuit and/or a vehicle component which have/has a throttle designed as described in this document.

According to a further aspect, a description is given of a (road) motor vehicle (in particular a passenger vehicle or a truck or a bus or a motorcycle) which comprises the throttle or liquid pipe described in this document.

According to a further aspect, a description is given of the use of a throttle described in this document within a liquid pipe and/or within a liquid circuit. In this case, the throttle can be used to meet one or more requirements in respect of the pressure loss of liquid as it flows through the liquid pipe in which the throttle is arranged, for one or more different viscosity values of the liquid. In particular, the throttle can be used (as described in this document) to increase the pressure loss of the liquid as it flows through the liquid pipe, for example at relatively high viscosity values of the liquid.

It should be noted that the methods, devices and systems described in this document can be used both alone and in combination with other methods, devices and systems described in this document. Furthermore, any aspects of the methods, devices and systems described in this document can be combined with one another in a variety of ways. In particular, the features of the claims can be combined with one another in a variety of ways.

The invention is explained in greater detail below with reference to exemplary embodiments.

DETAILED DESCRIPTION OF THE DRAWINGS

Figure 1A:
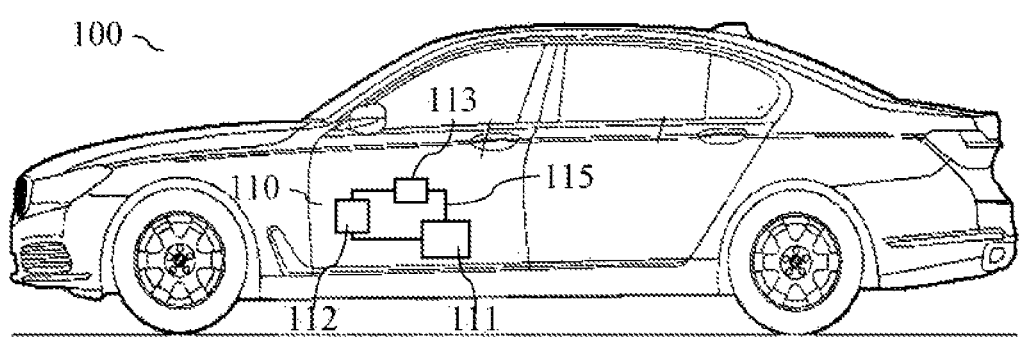
FIG. 1*a* shows an illustrative vehicle having a liquid circuit.

As explained at the outset, the present document deals with the efficient and precise adaptation of the flow properties of a liquid pipe to the viscosity of the liquid flowing through the liquid pipe. In this context, FIG. 1 shows an illustrative vehicle 100 having a liquid circuit 110. The liquid circuit 110 comprises, for example, a component 111 supplied with a certain liquid, in particular with oil, such as, for example, a transmission. Furthermore, the liquid circuit 110 can comprise a thermostat 112 which is configured to determine the temperature of the liquid in the liquid circuit 110. The liquid circuit 110 can furthermore comprise a temperature control module 113, which is configured to control the temperature of the liquid, in particular to cool it, as a function of the temperature determined. The individual modules 111, 112, 114 of the liquid circuit 110 can be connected to one another via liquid pipes 115.

Figure 1B:
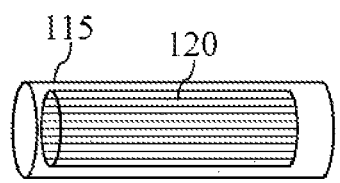
FIG. 1*b* shows an illustrative throttle in a liquid pipe.

As illustrated in FIG. 1*b*, one or more throttles 120 can be used in the liquid circuit 110 to adjust the flow properties of the liquid within the liquid circuit 110. In particular, a throttle 120 can be arranged in at least one liquid pipe 115, by way of which throttle the volume flow of the liquid in the liquid pipe 115 can be throttled and/or by way of which the pressure loss of the liquid can be adapted as it flows through the liquid pipe 115. In this case, the throttle 120 can have a constant throttle cross section along the entire length of the throttle 120.

As explained at the outset, the viscosity of the liquid in a liquid pipe 115 typically depends on the temperature of the liquid. This is particularly the case with (engine or transmission) oil. As the temperature drops, the viscosity of the liquid typically increases. At a certain volume flow of the liquid through the liquid pipe 115, the pressure loss or the pressure gradient of the liquid in a liquid pipe 115 typically increases with increasing viscosity of the liquid.

The component 111 to which the liquid is provided may have certain flow requirements for the liquid. In this case, the flow requirements can depend on the temperature or on the viscosity of the liquid. Illustrative flow requirements are the volume flow of the liquid and/or the pressure loss of the liquid at a certain volume flow of the liquid. In particular, a certain desired value of the pressure loss of the liquid (given in bar) for a certain kinematic viscosity of the liquid (given in St or cSt or m²/s) can be specified as flow requirements. Here, a specific desired value of the pressure loss can be specified for a plurality of different kinematic viscosities, if appropriate.

The pressure loss of the liquid which is caused by a throttle 120 typically depends on the clear passage or the cross section of the throttle 120 and on the length of the wall of the throttle 120 (in the direction of flow of the liquid) past which the liquid flows. By changing the clear passage or the cross section of the throttle 120, the achievable volume flow of the liquid is also influenced, and therefore it is typically advantageous to keep the clear passage or the cross section of the throttle 120 (in particular along the length of the throttle 120) unchanged or constant. The throttle 120 described in this document preferably has a clear passage or a cross section which (in particular, along the length of the throttle 120) remains unchanged or constant (or varies by less than 10% along the length of the throttle 120).

By way of the effective length of the wall of the throttle 120, it is possible to change the degree of wall friction on the liquid. In this case, the extent of wall friction increases with increasing effective length of the wall of the throttle 120. Furthermore, the extent of the wall friction is typically dependent on the viscosity of the liquid. In this case, the extent of the wall friction which is brought about on the liquid over a specific section of the wall of the throttle 120 typically increases with increasing viscosity of the liquid. By changing the effective length of the wall of the throttle 120, it is thus possible to change the gradient with which the pressure loss of the liquid changes as a function of the kinematic viscosity of the liquid.

The flow requirements of component 111 can be such that the pressure loss of the liquid should change relatively strongly as a function of the kinematic viscosity of the liquid. This can be brought about by a relatively long throttle 120 in order to provide a relatively long wall length. However, the use of a relatively long throttle 120 leads to relatively high installation space requirements for the throttle 120 and for the liquid pipe 115.

Figure 2A:
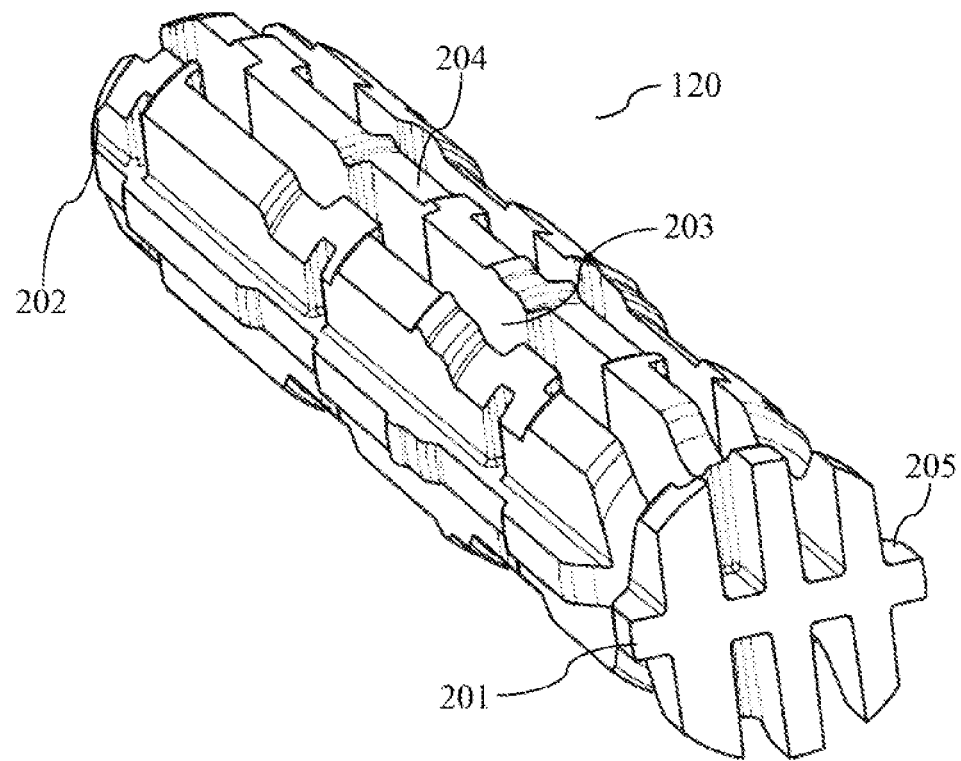
FIGS. 2*a* to 2*d* show different views of a viscosity-sensitive throttle.
Figure 2B:
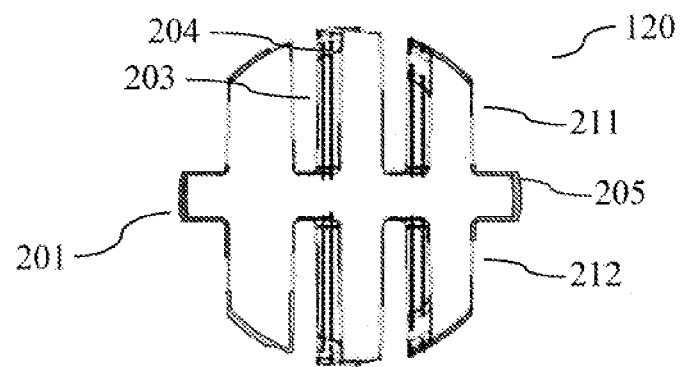
Figure 2C:
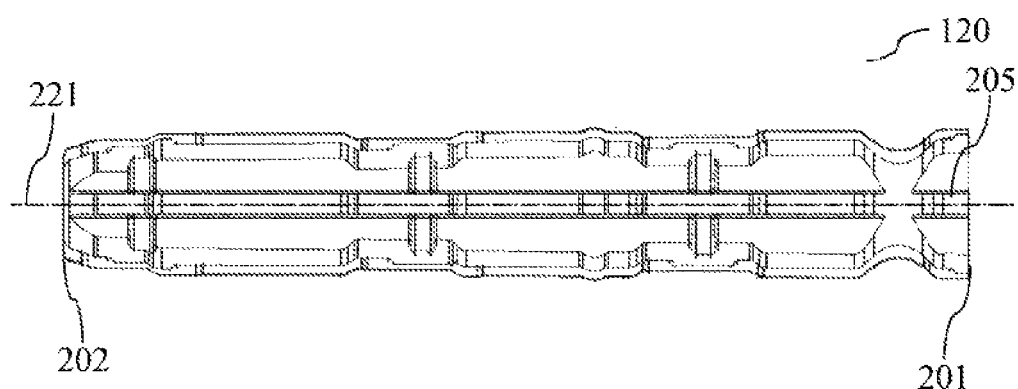
Figure 2D:
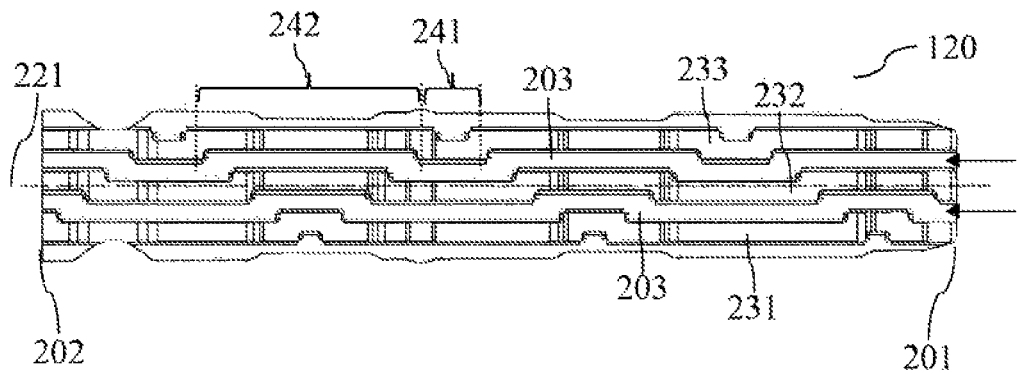

FIGS. 2*a* to 2*d* illustrate a throttle 120 which has at least one liquid channel 203 having at least one curved channel wall 204. By providing a liquid channel 203 having at least one channel wall 204 that does not extend in a straight line, the effective wall length of the throttle 120 can be increased without at the same time increasing the length of the throttle 120 (along the longitudinal axis 221 of the throttle 120). FIG. 2*a* shows the throttle 120 in a perspective view. FIG. 2*b* shows the throttle 120 in a view of the end face of the throttle 120 at the first end 201 (i.e. at the inlet) of the throttle 120. FIG. 2*c* shows the throttle 120 in a view from the side, wherein the walls 204 of the liquid channels 203 are arranged within or parallel to the plane of the image. FIG. 2*d* shows the throttle 120 in a view from above, wherein the walls (or ribs) 204 of the liquid channels 203 are arranged perpendicularly to the plane of the image.

As illustrated, for example, in FIG. 2*a*, a liquid channel 203 extends along the longitudinal direction or the longitudinal axis 221 of the throttle 120 from a first end 201 to a second end 202 of the throttle 120. In this case, the liquid channel 203 is delimited by at least two walls 204, each of which can have a curved shape. In order nevertheless to permit a cross section or clear passage which is constant along the longitudinal direction of the throttle 120, the two channel walls 204 have a complementary and/or corresponding shape with respect to one another. The throttle 120 can have one or more liquid channels 203, each with channel walls 204 that have a curved shape. In the example illustrated in FIGS. 2*a* to 2*d*, the throttle 120 has at least four liquid channels 203 with channel walls 204 extending in a curved manner in each case.

The curved shape of the channel walls 204, 231, 232, 233 can be seen especially from FIG. 2*d*. FIG. 2*d* shows three curved walls 231, 232, 233, by way of which two liquid channels 203 are formed, which extend along the longitudinal axis 221 of the throttle 120. As illustrated, for example, in FIG. 2*b*, the throttle 120 can have a (horizontal) dividing wall 205, which divides the throttle 120 into a first subregion 211 (on the first side of the dividing wall 205) and a second subregion 212 (on the opposite, second side of the dividing wall 205). The two subregions 211, 212 can be mirror-symmetrical with respect to one another in relation to the dividing wall 205. The (planar) dividing wall 205 can thus be designed to divide the throttle 120 along the longitudinal axis 221 into two subregions 211, 212 of identical construction. One or more liquid channels 203 having curved channel walls 204, 231, 232, 233 can be arranged in each subregion 211, 212.

In this case, the dividing wall 205 can in each case form a bottom of the individual liquid channels 203. The channel walls 204, 231, 232, 233 can each be arranged perpendicularly to the dividing wall 205.

As illustrated in FIG. 1b, the throttle 120 can be designed to be inserted into a liquid pipe 115 (in particular into a tube). The individual channel walls 204 and/or the dividing wall 205 can in this case be adapted to the profile of the liquid pipe 115. In particular, the individual channel walls 204 and/or the dividing wall 205 can be designed in such a way that the individual channel walls 204 and/or the dividing wall 205 each touch the inner wall of the liquid pipe 115, and therefore the individual liquid channels 203 are each delimited (fluidtightly) by the inner wall of the liquid pipe 115. A liquid channel 203 can thus be delimited (fluidtightly) in each case by two channel walls 204, 231, 232, 233, by the dividing wall 205 and by the inner wall of the liquid pipe 115.

The channel walls 231, 232, 233 illustrated in FIG. 2d have wall sections 241, 242 which are offset relative to one another in order to bring about a curved shape. The wall sections 241, 242 can extend parallel to the longitudinal axis 221. Furthermore, transitional regions between in each case two adjacent wall sections 241, 242 can extend obliquely with respect to the longitudinal axis 221 (with the result that the direction of flow of the liquid is changed). In an alternative example, the channel walls 231, 232, 233 can have, for example, a sinusoidal shape along the longitudinal axis 221 of the throttle 120.

Figure 3:
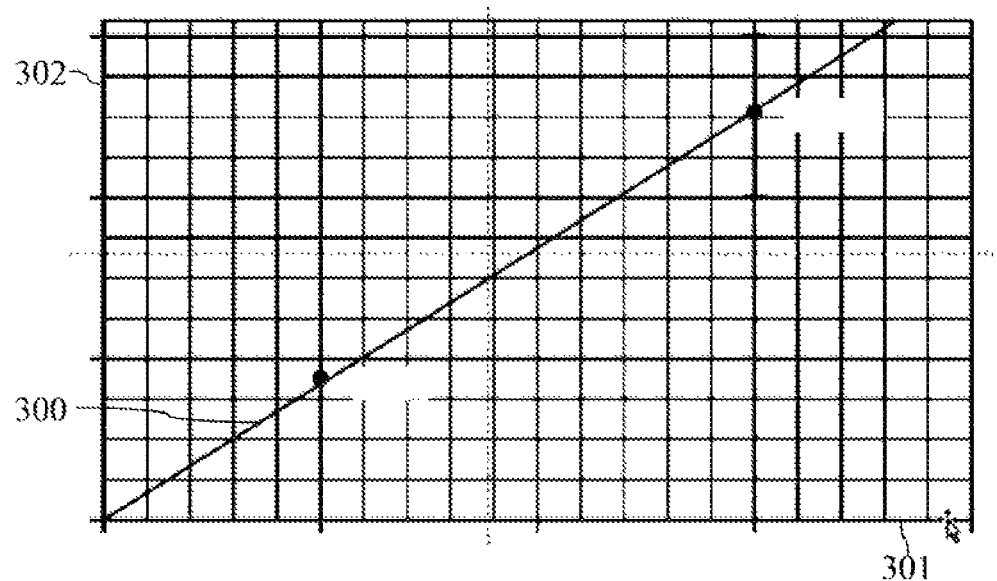
FIG. 3 shows illustrative requirements of a component.

FIG. 3 shows an illustrative desired relationship 300 between the pressure loss 302 of the liquid and the volume flow 301 of the liquid (for a liquid with a certain viscosity). Such a desired relationship 300 can be specified for different viscosities or viscosity values of the liquid. The length of the throttle 120 along the longitudinal axis 221 can be set to a certain value. In this case, the length of the throttle 120 can be set in such a way, for example, that, if the viscosity of the liquid is relatively low, a certain desired pressure loss 302 is achieved at a certain volume flow 301 (as specified by the desired relationship 300 for the relatively low viscosity) when a throttle 120 having one or more liquid channels 203 which each have channel walls 204 extending in a straight line is used.

In a second step, the shape of the channel walls 204 can then be adapted in such a way that the desired pressure loss 302 (for a certain volume flow 301) specified by the desired relationship 300 is brought about even in the case of a relatively high viscosity of the liquid. A throttle 120 having at least one liquid channel 203, which has at least one channel wall 204 having a curved shape along the longitudinal axis 221, can thus be used in an efficient manner to achieve the desired pressure loss 302 within a liquid pipe 115 or for a component 111.

A throttle 120 is thus described which makes it possible, without increasing the required installation space for the throttle 120, to allow viscosity-sensitive adjustment of the desired pressure loss 302 caused by the throttle 120. The throttle 120 described has at least one liquid channel 203 having at least one channel wall 204 which has a curved shape along the longitudinal axis 221 of the throttle 120. In particular, the liquid channel 203 can have a cross section that changes along the longitudinal axis 221 of the throttle 120 or a cross-sectional shape that changes. In this way, the wall friction caused by the liquid wall 204 can be increased, typically leading to an increased pressure loss of the liquid as it passes through the throttle 120. In particular, an enlargement of the surface area of the at least one channel wall 204 of the throttle 120 can be effected without (substantially) changing the clear passage of the throttle 120 and/or of the individual liquid channels 203. In this way, an increase in the temperature sensitivity or viscosity sensitivity of the throttle 120 can be brought about.

Optimized utilization of the existing installation space for a throttle 120 can be made possible by way of the measures described in this document. At the same time, the throttle 120 can furthermore be produced in an efficient manner (e.g. with an open-and-shut tool). The throttle 120 can be integrated efficiently into an existing liquid circuit 110. Furthermore, channel walls 204 with a robust wall thickness can be produced.

The present invention is not restricted to the exemplary embodiments shown. It should be noted, in particular, that the description and the figures are intended to illustrate the principle of the proposed methods, devices and systems only by way of example.

The invention claimed is:

1. A throttle for a liquid pipe, the throttle comprising:
   a liquid channel for a liquid flowing through the throttle, wherein the liquid channel extends along a longitudinal axis of the throttle, wherein:
   the liquid channel has at least one channel wall having a shape which curves along the longitudinal axis;
   the throttle has a dividing wall which extends along the longitudinal axis and across a width of the throttle, and divides the throttle into a first subregion and a second subregion; and
   the throttle has at least a first liquid channel in the first subregion and a second liquid channel in the second subregion.

2. The throttle according to claim 1, wherein the throttle has at least two channel walls which delimit the liquid channel, and at least one channel wall of the at least two channel walls has a shape which curves along the longitudinal axis.

3. The throttle according to claim 2, wherein the at least two channel walls have a shape which is complementary to one another such that a clear cross section of the liquid channel varies by at most 20% along the longitudinal axis.

4. The throttle according to claim 2, wherein the at least two channel walls have a shape which is complementary to one another in such that a clear cross section of the liquid channel varies by at most 10% along the longitudinal axis.

5. The throttle according to claim 1, wherein the at least one channel wall has a shape which curves such that an effective length of the at least one channel wall along which liquid slides as the liquid flows through the liquid channel is at least 5% greater than a length of the at least one channel wall having a rectilinear shape along the longitudinal axis.

6. The throttle according to claim 1, wherein:
   the throttle has a plurality of liquid channels, and
   at least one liquid channel of the plurality of liquid channels is delimited by at least one channel wall having a shape which curves along the longitudinal axis.

7. The throttle according to claim 6, wherein two directly adjacent liquid channels of the throttle have a common channel wall having a shape which curves along the longitudinal axis.

8. The throttle according to claim 1, wherein the dividing wall forms a first wall of the first liquid channel in the first subregion and a second wall of the second liquid channel in the second subregion.

9. The throttle according to claim 8, wherein:
the throttle is of symmetrical construction; and/or
the dividing wall forms a plane of symmetry of the throttle; and/or
the first subregion and the second subregion are of identical and/or corresponding construction to one another.

10. The throttle according to claim 1, wherein the at least one channel wall:
has different rectilinear sections which alternate repeatedly along the longitudinal axis and are each at different distances from the longitudinal axis; and/or
has a sinusoidal or a serpentine shape along the longitudinal axis; and/or
is configured to change a direction of flow of the liquid in the liquid channel repeatedly along the longitudinal axis.

11. The throttle according to claim 1, wherein the at least one channel wall:
has different rectilinear sections which alternate repeatedly along the longitudinal axis and are each at different distances from the longitudinal axis; and/or
has a sinusoidal or a serpentine shape along the longitudinal axis; and/or
is configured to change a direction of flow of the liquid in the liquid channel periodically along the longitudinal axis.

12. The throttle according to claim 1, wherein the throttle is constructed such that the throttle is manufacturable in an open-and-shut injection mold.

13. The throttle according to claim 1, wherein:
the throttle has a length along the longitudinal axis that is greater by a factor of 2 or more than a diameter of the throttle transversely to the longitudinal axis; and/or
the liquid channel is configured to be flowed through by the liquid along the longitudinal axis.

14. The throttle according to claim 1, wherein a length of the throttle along the longitudinal axis and a curved shape of the at least one channel wall are configured such that the liquid flowing through the throttle has a respective desired pressure loss for each of at least two different viscosity values as the liquid flows through the throttle.

15. The throttle according to claim 1, wherein a length of the at least one channel wall along the longitudinal axis and a curved shape of the at least one channel wall are configured such that the liquid flowing through the throttle has a respective desired pressure loss for each of at least two different viscosity values as the liquid flows through the throttle.

16. The throttle according to claim 1, wherein the liquid channel is configured such that, as a result of a curved shape of the at least one channel wall, a pressure loss of the liquid as the liquid flows through the liquid channel is increased in comparison with another liquid channel which has a rectilinear shape of a channel wall.

17. The throttle according to claim 16, wherein the pressure loss is increased by 1 bar or more for the liquid which has a kinematic viscosity of $10^{-4}$ m²/s or higher.

18. The throttle according to claim 1, wherein the throttle is configured such that an inner wall of the liquid pipe forms a wall of the liquid channel when the throttle is situated in the liquid pipe.

19. A liquid pipe having a hollow profile in which the throttle according to claim 1 is arranged.

* * * * *